United States Patent

Ishibe et al.

[11] Patent Number: 5,825,410
[45] Date of Patent: Oct. 20, 1998

[54] APPARATUS FOR REPRODUCING STILL IMAGES OF A PLURALITY OF FRAMES

[75] Inventors: Hiroshi Ishibe, Kyoto; Manabu Inoue, Kobe; Hirokazu Yagura, Sakai; Takehiro Katoh, Nara; Tetsuo Yamada, Amagasaki; Kyoko Kakudo, Osaka; Katsuyuki Nanba, Osakasayama, all of Japan

[73] Assignee: Minolta Co., Ltd., Osaka, Japan

[21] Appl. No.: 983,320

[22] Filed: Nov. 30, 1992

[30] Foreign Application Priority Data

Nov. 29, 1991 [JP] Japan ................................ 3-317125

[51] Int. Cl.⁶ .......................... H04N 5/253; H04N 9/47; H04N 3/36; H04N 9/11
[52] U.S. Cl. ........................ 348/107; 348/97; 348/105; 348/106
[58] Field of Search .................................. 358/209, 226, 358/227, 228, 214, 54; 348/96, 97, 98, 99, 100, 106, 107, 108, 105

[56] References Cited

U.S. PATENT DOCUMENTS

| | | |
|---|---|---|
| 4,482,924 | 11/1984 | Brownstein ............................. 358/302 |
| 4,485,406 | 11/1984 | Brownstein ............................. 358/227 |
| 4,603,966 | 8/1986 | Brownstein ............................. 355/45 |
| 4,641,198 | 2/1987 | Ohta et al. ............................. 358/285 |
| 4,864,332 | 9/1989 | Harvey ................................... 354/21 |
| 4,998,167 | 3/1991 | Jagna ..................................... 358/140 |
| 5,157,482 | 10/1992 | Cosgrove ................................ 358/54 |

FOREIGN PATENT DOCUMENTS

| | | | |
|---|---|---|---|
| 0041376 A2 | 1/1991 | European Pat. Off. ....... H04N 1/387 |
| 4-36514 | 6/1992 | Japan ............................ H04N 9/11 |
| WO90/04302 | 4/1990 | WIPO ........................... H04N 1/387 |
| WO9004302 | 4/1990 | WIPO ........................... H04N 1/387 |

*Primary Examiner*—Bipin Shalwala
*Attorney, Agent, or Firm*—Burns, Doane, Swecker & Mathis, LLP

[57] ABSTRACT

In still frame images from a film, the first frame of an image block is produced in a fade-in manner for gradually outputting a picture. If the end of a beginning part of a theme block is detected from information for a next frame, the process is advanced to a step to select a production method including relevantly large movement on the assumption that the scene is moved to an intermediate part of the theme block. If the intermediate part is ended, a different production method including relevantly small movement is selected on the assumption that the scene is moved to an end part.

26 Claims, 21 Drawing Sheets

FIG. 19    HIGH-ORDER 2 BITS

| LOW ADDRESS | 0 0 | 0 1 | 1 0 | 1 1 |
|---|---|---|---|---|
| 00H | | | | |
| 01H | FIRST FRAME       YEAR | 10th FRAME       YEAR | 19th FRAME       YEAR | 28th FRAME       YEAR |
| 02H | 〃       MONTH | | | |
| 03H | 〃       DAY | | | |
| 04H | 〃       EZ/PAN INFORMATION | | | |
| 05H | 〃       PRINT/NON-PRINT INFORMATION | | | |
| 06H | 〃       VERTICAL INFORMATION | | | |
| 07H | 〃       SHOOTING MAGNIFICATION | | | |
| 08H | 〃       SHOOTING DISTANCE | | | |
| 09H | 〃       A V | | | |
| 0AH | 〃       T V | | | |
| 0BH | 〃       SERIAL SHOOTING INFORMATION | | | |
| 0CH | 〃       MAIN OBJECT POSITION INFORMATION | | | |
| 0DH | 〃       FLASH INFORMATION | | | |
| 0EH | 〃       TIME | | | |
| 0FH | 〃       COMMENT | | | |
| ⋮ | ⋮ | ⋮ | ⋮ | ⋮ |
| 21H | SECOND FRAME       YEAR | 11th FRAME       YEAR | 20th FRAME       YEAR | 29th FRAME       YEAR |
| ⋮ | | | | |
| 80H | ISO SENSITIVITY | COLOR CORRECTION INFORMATION | | |
| 81H | NUMBER OF FILMS | EXPOSURE LEVEL INFORMATION | | |
| 82H | LATITUDE INFORMATION | NUMBER OF EACH FORMAT PRINT | | |
| 83H | NEGATIVE/POSITIVE INFORMATION | TOTAL NUMBER OF PRINTED FRAMES | | |
| 84H | | | | |
| ⋮ | | | | |
| FFH | | | | |

F I G. 2 0

| INFORMATION LEVEL 1 | INFORMATION LEVEL 2 | INFORMATION LEVEL 3 | INFORMATION LEVEL 4 |
|---|---|---|---|
| ① NEGATIVE/POSITIVE INFORMATION<br>② ISO INFORMATION<br>③ NUMBER OF REPRODUCEABLE FRAMES | ① ② ③<br>④ DATE, TIME<br>⑤ VERTICAL INFORMATION<br>⑥ EZ/PAN INFORMATION | ① ② ③ ④ ⑤ ⑥<br>⑦ TYPE OF LIGHT SOURCE | ① ② ③ ④ ⑤ ⑥ ⑦<br>⑧ OTHER SHOOTING INFORMATION<br>⑨ INFORMATION FROM LABORATORY |

FIG. 21

| | CONDITIONS | PRODUCTION ① | | PRODUCTION ② | COUNTER |
|---|---|---|---|---|---|
| NORMAL TRANSVERSE | ∞ | FADE IN→QUIESCING→FADE OUT (3) | Zd | 1.4X FADE IN→QUIESCING→ZOOM DOWN→QUIESCING (1.5) (3) →FADE OUT | 3 |
| | 1/200 > β, β > 1/80 | | | | |
| | 1/200 < β < 1/120 | | Zu | FADE IN→QUIESCING→FADE OUT (5) | 2 |
| | 1/120 < β < 1/80 | FADE IN→QUIESCING→ZOOM UP 1.4X→QUIESCING (3) (1.5) →FADE OUT | Zd | 1.4X FADE IN→QUIESCING→ZOOM DOWN→QUIESCING (1.5) (3) →FADE OUT | 2 |
| NORMAL VERTICAL | ∞ | 1.4X FADE IN→QUIESCING→ZOOM DOWN 1.0X (1.5) (3) →QUIESCING→FADE OUT (3) | Zu | 0.3X FADE IN→QUIESCING→ZOOM UP (1.5) (3) →0.7X QUIESCING→ FADE OUT (3) | 2 |
| | FINITE | FADE IN→QUIESCING→ZOOM DOWN 0.3→QUIESCING (2) (4) TILTING→FADE OUT →MOVE→FADE OUT (6) | M | 0.7X FADE IN→QUIESCING→FADE OUT (5) | 2 |
| PANNING TRANSVERSE | ∞ | 1.7X FADE IN→PANNING→FADE OUT (10) | M | 1.7X FADE IN→QUIESCING→ZOOM DOWN (1.5) (3) →1.0X QUIESCING→FADE OUT (3) | 2 |
| | FINITE | 1.7X FADE IN→QUIESCING→ZOOM DOWN (1.5) (3) →1.0 X QUIESCING→FADE OUT (3) | M | 1.7X FADE IN→PANNING→ FADE OUT (10) | 2 |
| PANNING VERTICAL | — | 2.4X FADE IN→TILT UP→FADE OUT (8) | | 2.4X FADE IN→QUIESCING→ZOOM DOWN (1.5) (3) →0.7X QUIESCING→ FADE OUT (3) | Zd 3 |

(TIME)

APPARATUS FOR REPRODUCING STILL IMAGES OF A PLURALITY OF FRAMES

BACKGROUND OF THE INVENTION

1. Field of the Invention

The present invention relates to an apparatus, such as a film video player, for reproducing still images of a plurality of frames, and more particularly, it relates to a still image reproducing apparatus which can keep the user's interest.

2. Description of the Background Art

There has recently been proposed an apparatus for reproducing still images, such as pictures of a developed film, on a television or the like. However, such a conventional apparatus merely reproduces still pictures frame by frame, so simply that the user loses his interest. Although there has also been proposed an apparatus having a zooming function and the like, the reproducing method thereof is too simple to satisfy the user.

U.S. Pat. No. 4,482,924 describes a film video player, which has a zooming function and a vertical and horizontal panning function. On the other hand, U.S. Pat. No. 4,485,406 describes a similar film video player, which has a function of rotating reproduced pictures in addition. U.S. Pat. No. 4,603,966 also describes a similar film video player.

However, the film video players described in the aforementioned literatures have only zooming, panning and/or picture rotating functions, and none of these Patents discloses a technique of varying the reproducing methods for keeping the user's interest.

SUMMARY OF THE INVENTION

An object of the present invention is to provide an apparatus, such as a film video player, for reproducing still images of a plurality of frames, which can vary reproducing methods for entertaining the user.

Another object of the present invention is to provide an apparatus which is adapted to divide still images of a plurality of frames into blocks, each being formed by a plurality of related frames, and reproduce the still images by methods responsive to the blocks, thereby keeping the user's interest.

In order to attain the aforementioned objects, still images of a plurality of frames are divided into a plurality of blocks in the inventive picture reproducing apparatus, so that a method of reproducing the still images is decided every block.

A still image reproduce according to another aspect of the present invention comprises read means for reading information provided in respective frames of still images and decision means for deciding various reproducing methods on the basis of the as-read information.

A still image reproducer according to still another aspect of the present invention comprises means for deciding a still image reproducing method and control means for controlling the deciding means not to decide the same reproducing method repeatedly over a prescribed number of times.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 illustrates states of data on respective frames recorded in a magnetic information recording part;

FIG. 20 illustrates information levels recorded in respective frames and contents thereof; and FIG. 21 illustrates exemplary production by picture format magnification information.

DESCRIPTION OF THE PREFERRED EMBODIMENTS

Embodiments of a film player according to the present invention are now described with reference to the drawings.

Figure 1:
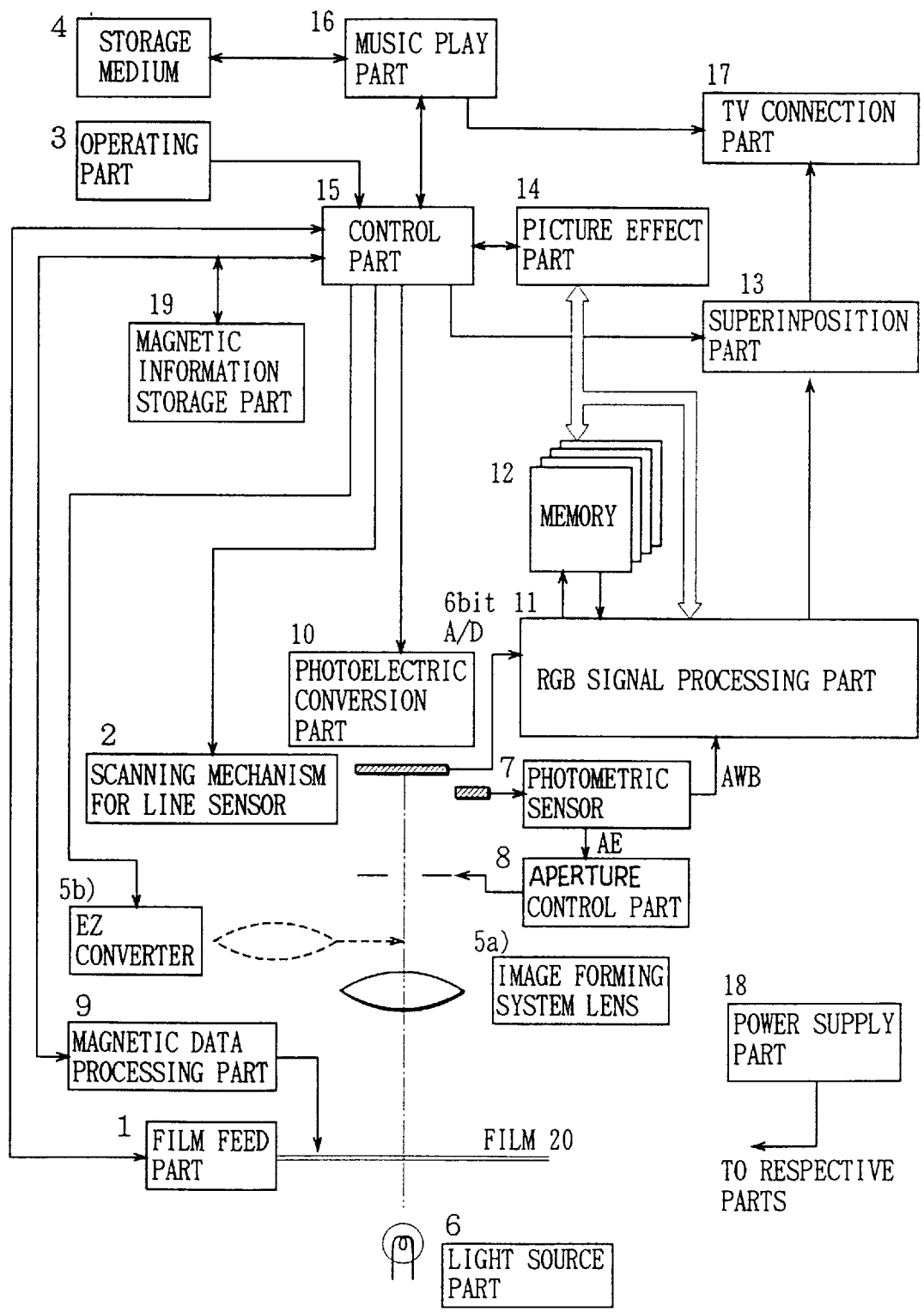
FIG. 1 is a block diagram showing a film player according to the present invention.

FIG. 1 is a block diagram showing a principal part of the film player according to the- present invention. Referring to FIG. 1, a control part 15 of the film player is connected with a film feed part 1 for feeding a film 20, a line sensor scanning mechanism 2 for scanning a line sensor such as a CCD, an operating part 3 which is formed by a reproduction start switch, a reproduction stop switch, a music selection switch, a picture inversion switch a picture deleting switch, a pause switch, a panning switch, a tilting switch and the like, and a recording medium 4 which stores a plurality of pieces.

A light source part 6 which is formed by a halogen lamp or a fluorescent lamp for illuminating the film 20 emits light, which reaches a photoelectric conversion part 10 such as a CCD (hereinafter referred to as CCD) through an image forming system lens 5a and a converter 5b for enlarging (EZ) trimmed frames at need. At this time, a photometric sensor 7 measures the light which is incident upon the photoelectric conversion part 10 through the film 20 and adjust white balance (WB) and an aperture. The aperture is further controlled by an aperture control part 8 in response to a signal received from the photometric sensor 7.

As hereinafter described, magnetic information which is recorded on the film 20 is stored in a magnetic information storage part 19, and inputted in the control part 15 by a magnetic data processing part 9. The magnetic data processing part 9 further records prescribed data in a magnetic part of the film 20.

Data outputted from the CCD 10 are compressed and converted to an NTSC signal by a signal processing part 11. The picture data processed in the signal processing part 11 are stored in a memory 12. Date information etc. recorded in the magnetic information part of the film 20 is reproduced with pictures by a superimposition part 13. A picture reproducing method (scrolling, rotation etc.) and a switching method (overlapping, fade-in, fade-out etc.) are controlled by a picture effect part 14.

Music data stored in the recording medium 4 are read by a music play part 16, and subjected to processing for reproduction (picture). Signals from the music play part 16 and the superimposition part 13 are transmitted to a TV connection part 17 to be connected with an external unit such as a television for reproducing the pictures and the music. A power supply part 18 is provided in order to drive the overall film player.

(1) First Embodiment

Figure 2:
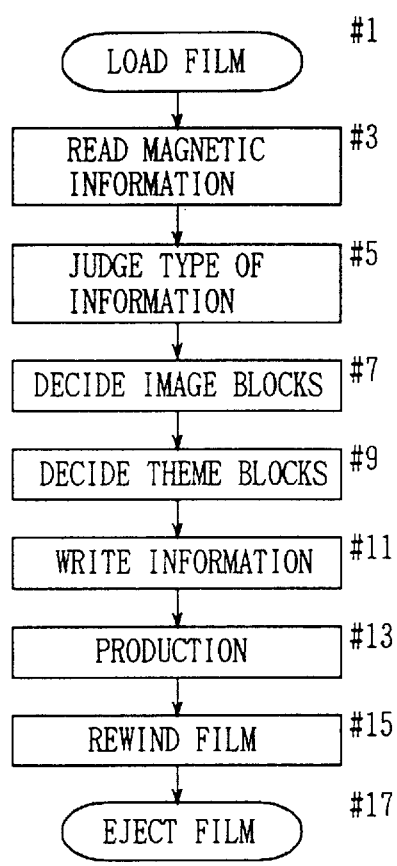
FIG. 2 is a flow chart schematically showing an operation for picture reproduction in a film player according to a first embodiment of the present invention.

FIG. 2 is a flow chart schematically illustrating an operation for picture reproduction in a film player according to a first embodiment of the present invention.

A developed film is loaded at a step #1, and magnetic information stored in a magnetic-part provided in the as-loaded film is read at a step #3. At a step #5, the type of the recorded information is judged from the as-read information, in order to vary the production level in reproduction with the type, number etc. of the stored information.

At a step #7, the film is divided into a plurality of image blocks under prescribed conditions, for the following reasons:

1) The film is divided into a plurality of blocks to vary the images, thereby preventing monotonous reproduction.
2) Images are established every block to be distinguished from those in other blocks, thereby giving variety to the film.
3) When the user selects a piece, it is possible to reproduce the pictures in response to the play time of the selected piece thereby avoiding unpreferable mismatch between ends of the reproduced pictures and the piece.

After the film is divided into a plurality of blocks at the step #7, each image block is further divided into a plurality of theme blocks at a step #9, in order to provide beginning, intermediate and end parts in each block to introduce a story with a climax, thereby entertaining the user.

At a step #11, information as to the image blocks, theme blocks, selected pieces and the like are recorded in a prescribed position of the film such as a magnetic part provided in a lead part thereof, for example.

Figure 17:
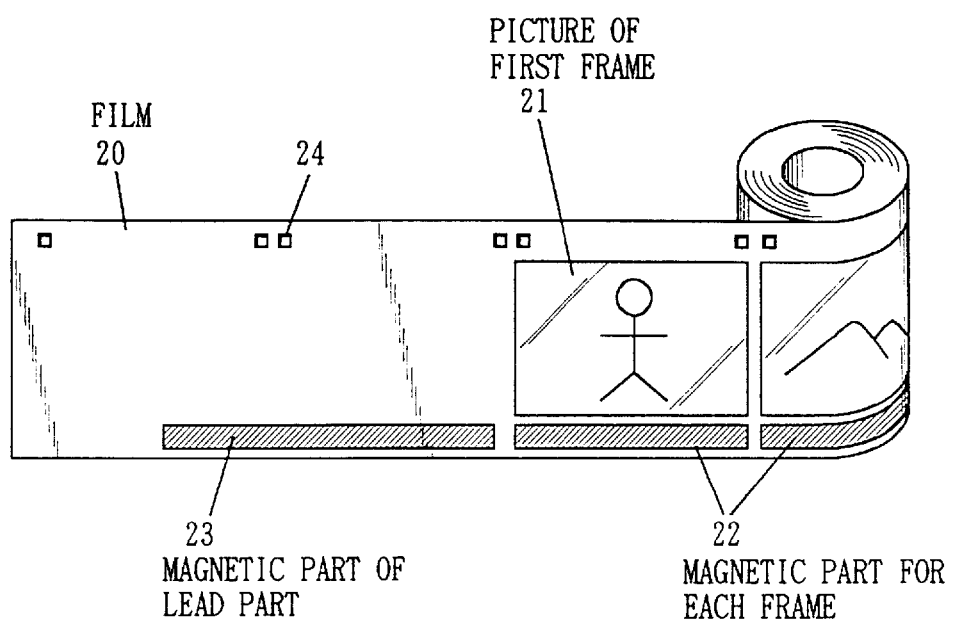
FIG. 17 illustrates a developed film.

FIG. 17 illustrates a state of a developed film 20. A magnetic part 23 of a lead part is provided in front of a picture 21 of the first frame in the film 20. On the other hand, a magnetic part 22 recording shooting information etc. is provided under each frame. Perforations 24 are provided in order to feed the film 20.

Referring again to FIG. 2, the film player automatically enters a reproduction standby state by simply reading the information recorded in the lead part of the film 20 if next reproduction is made by the operation at the step #11.

After recording of the information, production is made at a step #13. Thereafter the film 20 is rewound at a step #15, and ejected at a step #17.

FIGS. 3 to 11 are flow charts illustrating the contents of the respective steps shown in FIG. 2 in detail.

Figure 3:
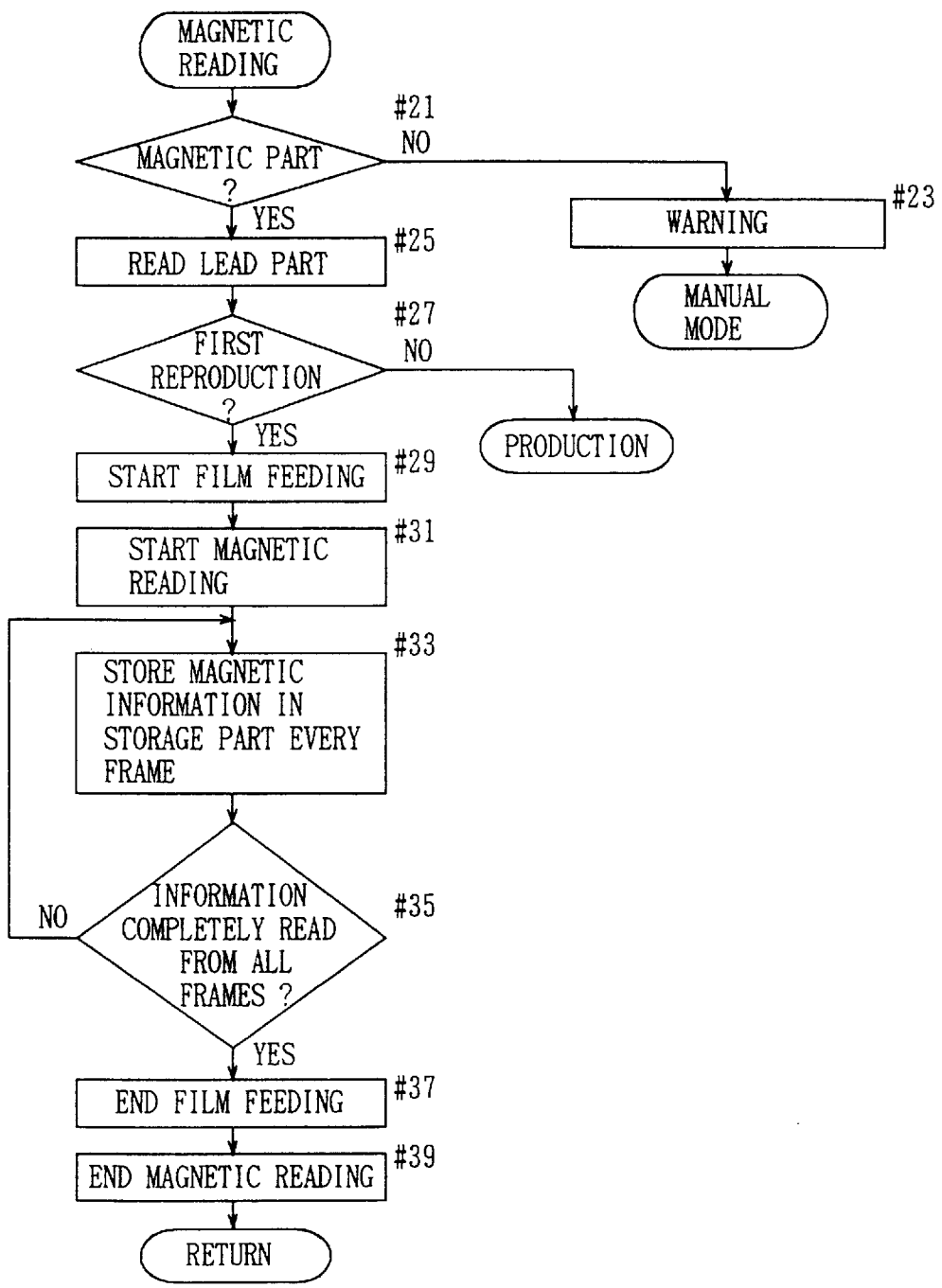
FIG. 3 is a flow chart showing the contents of the respective steps shown in FIG. 2 in detail.
Figure 18:
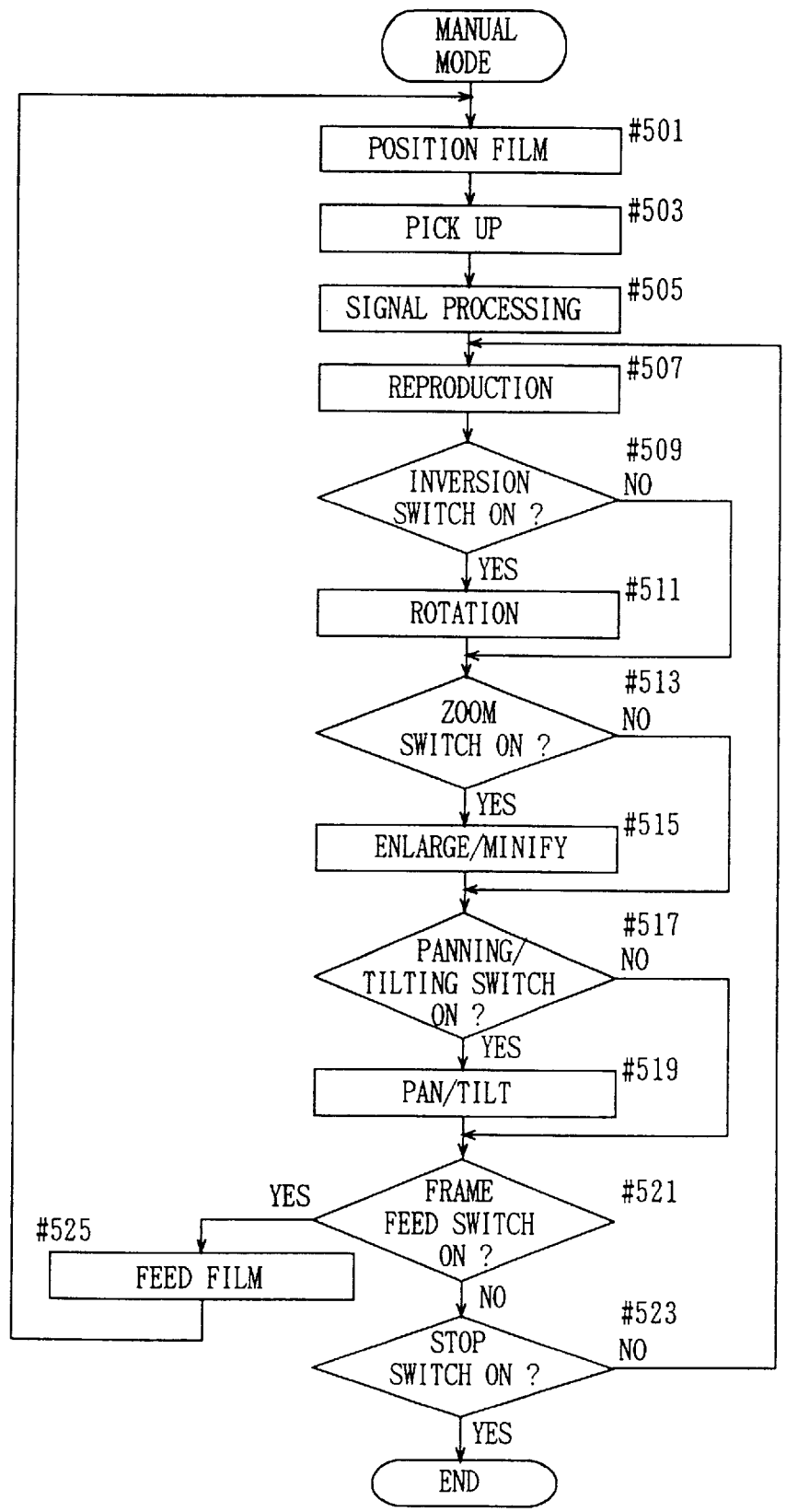
FIG. 18 is a flow chart illustrating the content of a manual mode.

FIG. 3 is a flow chart illustrating the magnetic information reading step #3 shown in FIG. 2 in detail. Referring to FIG. 3, a determination is made as to whether or not the as-loaded film 20 has a magnetic part. If the determination is of no, the process is advanced to a step #23 to give a warning, and thereafter the process enters a manual mode. The manual mode is now described with reference to FIG. 18.

First, the film 20 is positioned and a picture to be reproduced is set on a prescribed pickup position (step #501). If the film 20 is just loaded, the picture 21 of the first frame is set. Then, the as-set picture is scanned and taken by the line sensor, and the data thereof are signal-processed (steps #503 and #505). The signal-processed picture data are reproduced on the television (step #507).

Then the inversion switch is manually pushed by the user to rotate the picture (steps #509 and #511). In a similar manner, the zoom switch is pushed to enlarge or minify the picture (steps #513 and #515). Further, the panning switch or the tilting switch is pushed to horizontally or vertically move the picture (steps #517 and #519).

Then, a determination is made as to whether or not a frame feed switch is pushed, and the film is fed to set the next frame if the determination is of yes (steps #521 and #525). If the determination is of no, on the other hand, another determination is made as to whether or not a stop switch is in an ON state (step #523). The process is returned to the step #507 if the-determination is of no, while the reproduction is immediately stopped if the determination is of yes.

Referring again to FIG. 3, magnetic information recorded in the magnetic part of the lead part is read at a step #25 if the film 20 has the magnetic part. If the film has already been reproduced, the magnetic part has this information and hence the process is advanced to a production step. If the film is reproduced for the first time, on the other hand, the process is advanced to a step #29 to start film feeding and magnetic reading for reading information as to all frames and storing the same in the magnetic information storage part 19 (steps #29 and #31). The magnetic information of each frame is recorded at a step #33, and if the information of all frames is completely read (yes at a step #35), the film feeding and the magnetic reading are ended at steps #37 and #39 respectively so that the process is returned.

FIG. 19 illustrates states of data of respective frames recorded in the magnetic information storage part 19, and FIG. 20 illustrates information levels described in each frame and the contents thereof.

Figure 4:
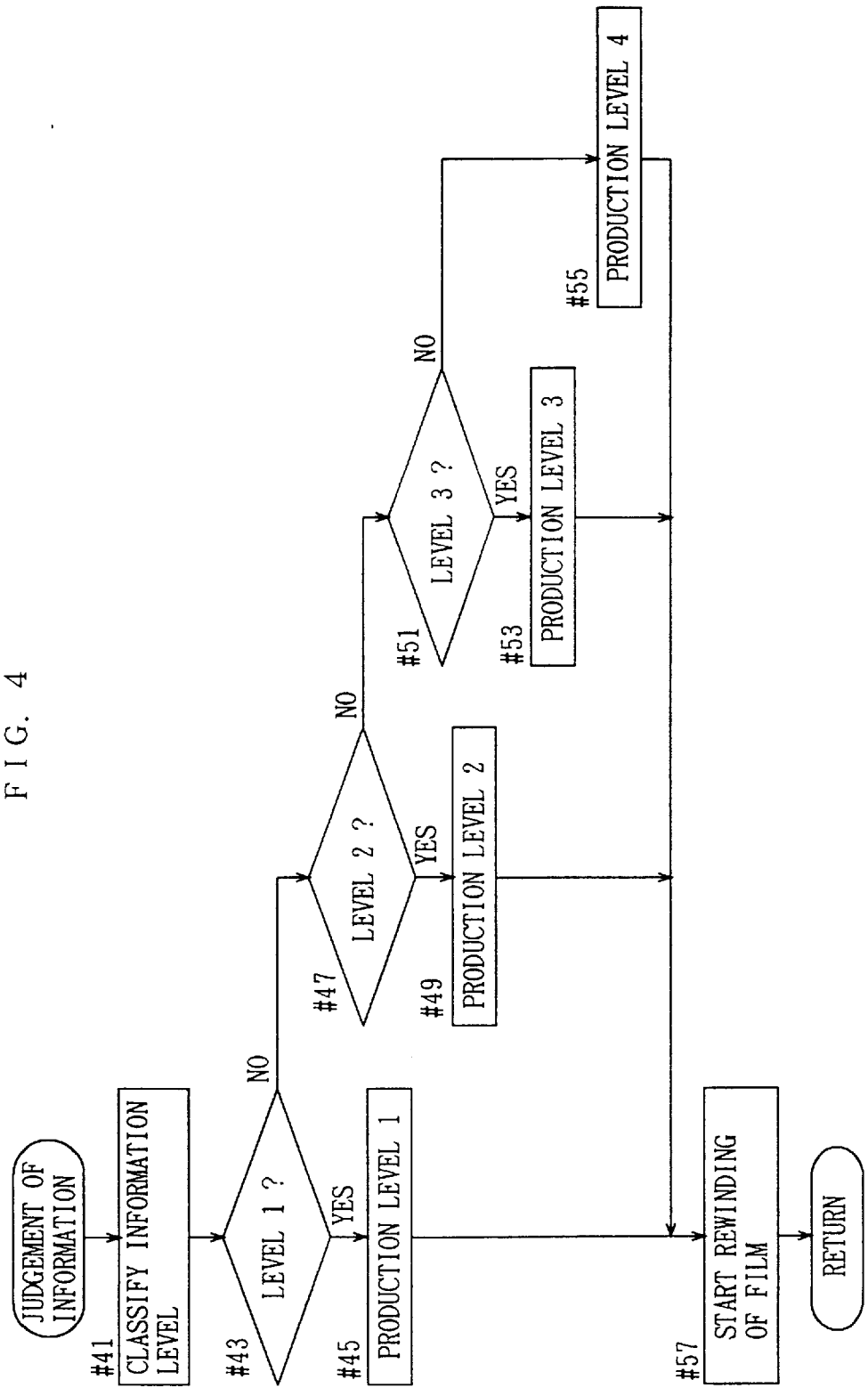
FIG. 4 is a flow chart showing an operation for deciding a production level in response to the type of information.

FIG. 4 is a flow chart illustrating an operation of deciding a production level in response to the type of recorded information. At a step #41, the recorded information is classified into a level 1, 2, 3 or 4 in response to the type and number thereof. The information level 1 corresponds to a production level 1. In a similar manner, a production level 2, 3 or 4 is decided in response to the information level 2, 3 or 4 (steps #43 to #55).

The classification of the production level is employed for a later step of deciding image blocks. After the production level is decided, rewinding of the film 20 is started at a step #57, and the process is returned.

Figure 5:
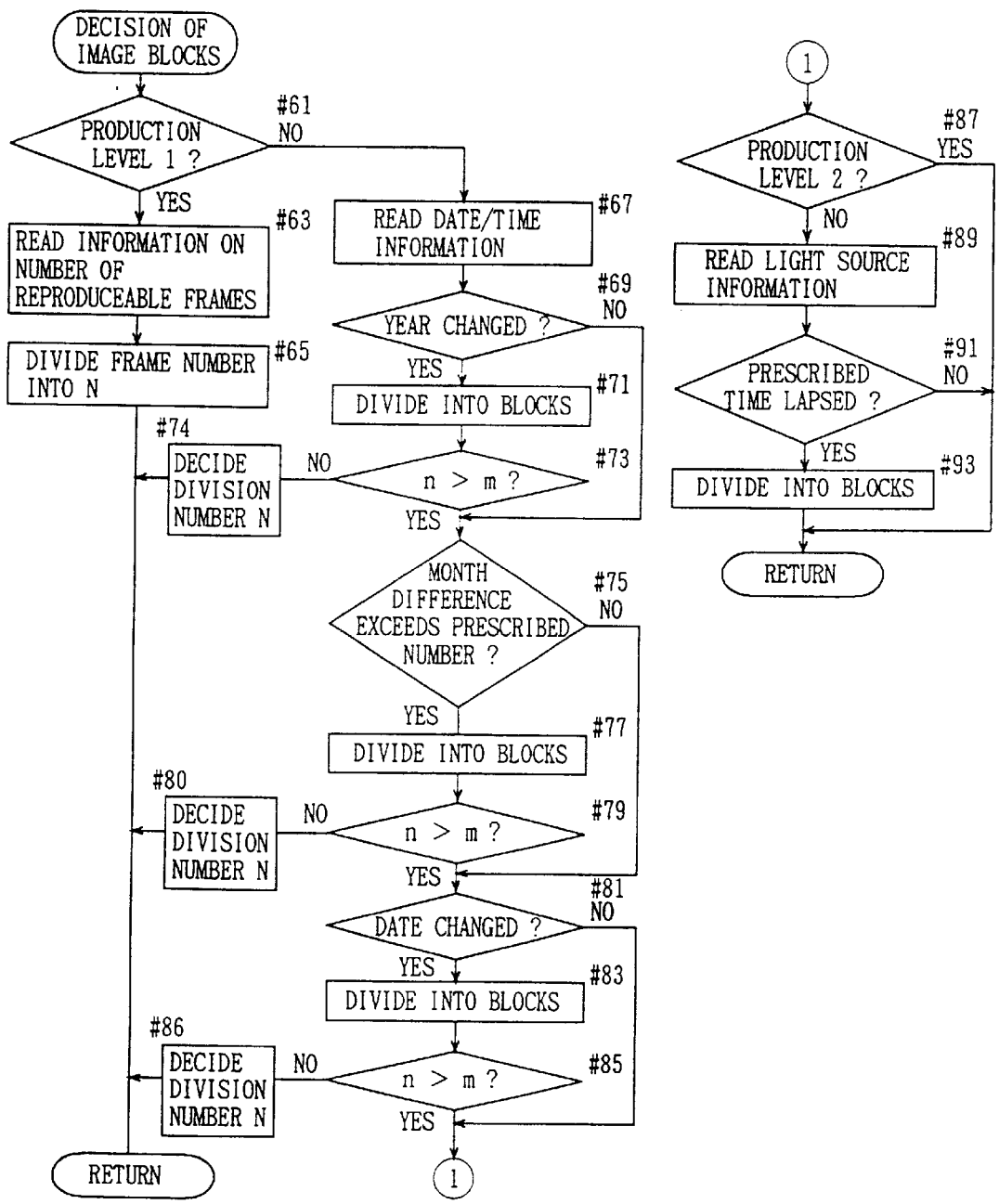
FIG. 5 is a flow chart showing a method of deciding image blocks.

FIG. 5 is a flow chart illustrating a method of deciding the image block. If the production level 1 is detected at a step

61, information on the number of reproducible frames is read from the magnetic information storage part 19 at a step #63, the frame number is simply divided into a number N at a step #65, and the process is returned.

If the production level 1 is not detected at the step #61, date and time information is read at a step #67, and if year change is included in the frames, the film is divided into blocks between the frames including the year change (step #71). If a number n of frames included in each block is smaller than a number m of frames required for forming one block, the number N is decided as that for division at a step #74, and the process is returned. If the number n is greater than the number m, on the other hand, a determination is made as to whether or not difference between months exceeds a prescribed number (step #75). If the determination is of yes, the film is divided into further blocks (step #77). If the number n becomes smaller than the number m as the result, the number N is decided as that for division, while the film is divided into further blocks on the basis of date change if the number n is greater than the number m.

If the number n exceeds the number m as the result of division based on the date change, the process is advanced to a step #87. At the step #87, a determination is made as to whether or not the production level is at 2, so that the division is ended and the process is returned if the determination is of yes. If the determination is of no, on the other hand, light source information is read at a step #89. If a lapse of a prescribed time is thereafter detected at a step #91, the film is divided into blocks on the assumption that the pictures have been shot outdoors and indoors, and the process is returned. The film may be divided into blocks on the basis of another information. For example, a single image block may be formed by serially shot frames in response to serial shooting information.

Figure 6:
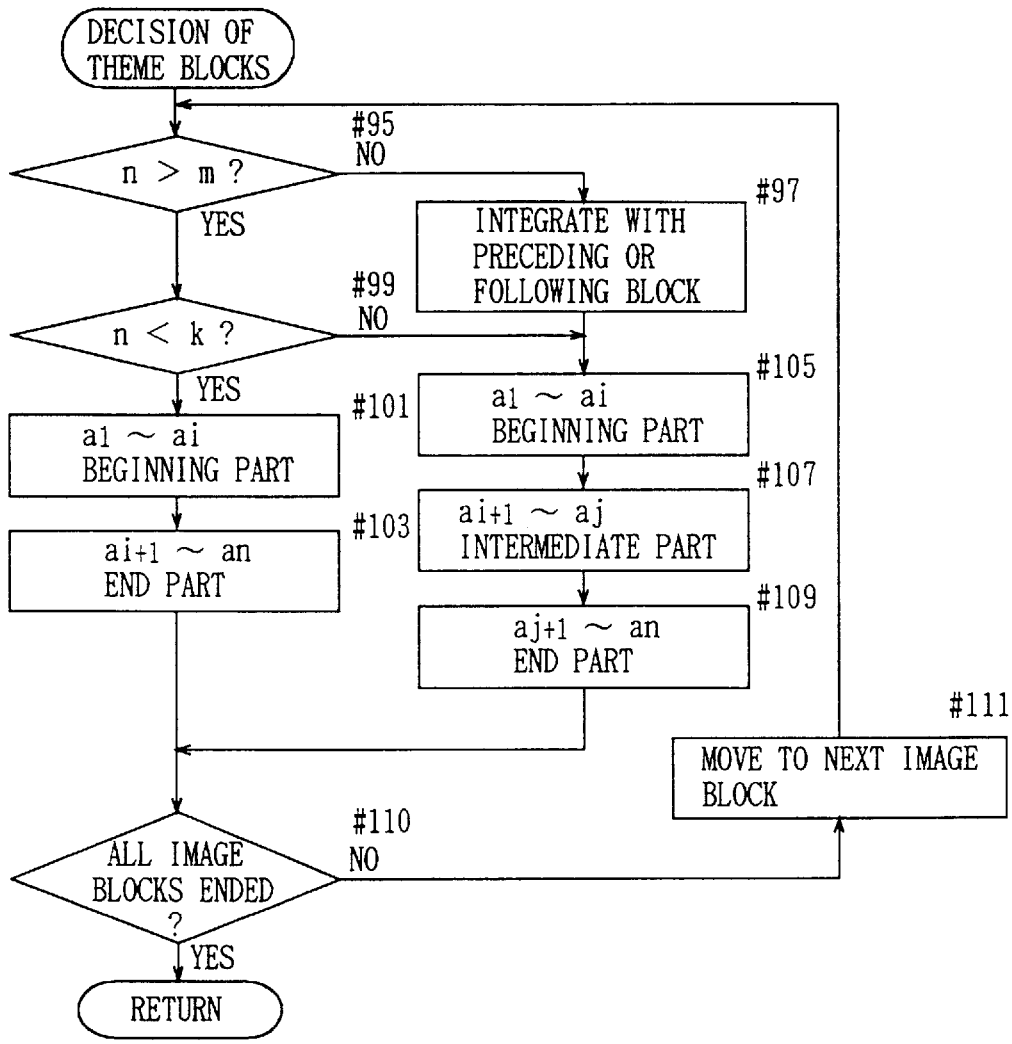
FIG. 6 is a flow chart showing an operation for dividing each image block into a plurality of theme blocks.

After the film is divided into image blocks in FIG. 5, each image block is further divided into a plurality of theme blocks. FIG. 6 shows the content of this operation. If the number n of frames forming a single image block is smaller than the first prescribed number m of frames at a step #95, the process is advanced to a step #97 to integrate the block with a preceding or following one, and then the process is advanced to a step #105. If the number of frames included in a single image block is small, it is difficult to introduce a story for attaining effective production when the production level is at 1, for example.

If the number n is greater than the number m at the step #95, on the other hand, this number n is compared with a second prescribed number k of frames at a step #99. The process is advanced to a step #101 if the number n is smaller than the number k, while the same is advanced to a step #105 if the former is greater than the latter. At steps #101 and #103, each image block is divided into two theme blocks including a beginning part which is formed by a first frame a1 to a prescribed (e.g., intermediate) frame ai and an end part which is formed by a frame ai+1 to the final frame an of the image block. At steps #105 to #109, on the other hand, each image block is divided into three theme blocks including a beginning part which is formed by the first frame a1 to a prescribed (e.g., third) frame ai, an intermediate part which is formed by a frame ai+1 to a prescribed (e.g., two-third) frame, and an end part which is formed by the remaining frames, and the process is returned.

The image blocks may be divided into the theme blocks simply in response to the number of frames, or in response to shooting information or the like similarly to the image blocks.

Figure 7:
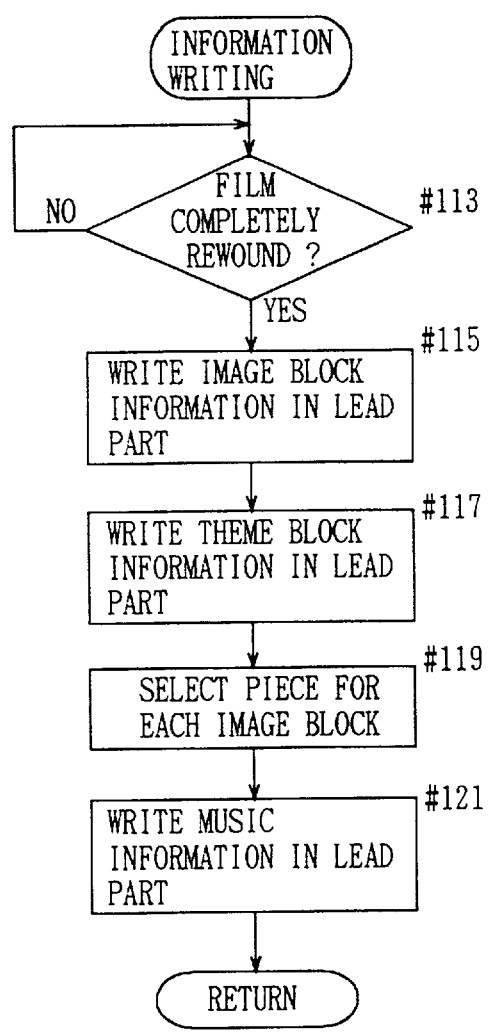
FIG. 7 is a flow chart showing an operation for writing various data in a lead part of a film 7.

FIG. 7 is a flow chart showing an operation for writing various information in the lead part of the film 20. Completion of rewinding of the film 20 is waited at a step #113, and then the process is advanced to a step #115 to write information of the image blocks as to boundary frames etc. in the lead part. Information of theme blocks is similarly written in the lead part at a step #117, and the process is advanced to a step #119, to select pieces corresponding to the image blocks from the recording medium 4 in response to the information of the image blocks. At this time, the pieces may be automatically selected in response to the lengths of the respective blocks, or freely selected by the user. The information of the selected pieces is written in the lead part at a step #121, and the process is returned.

Due to the operation shown in FIG. 7, it is not necessary to divide the film into blocks and select the pieces every reproduction, and the next reproduction can be made by simply reading the lead part.

Figure 8:
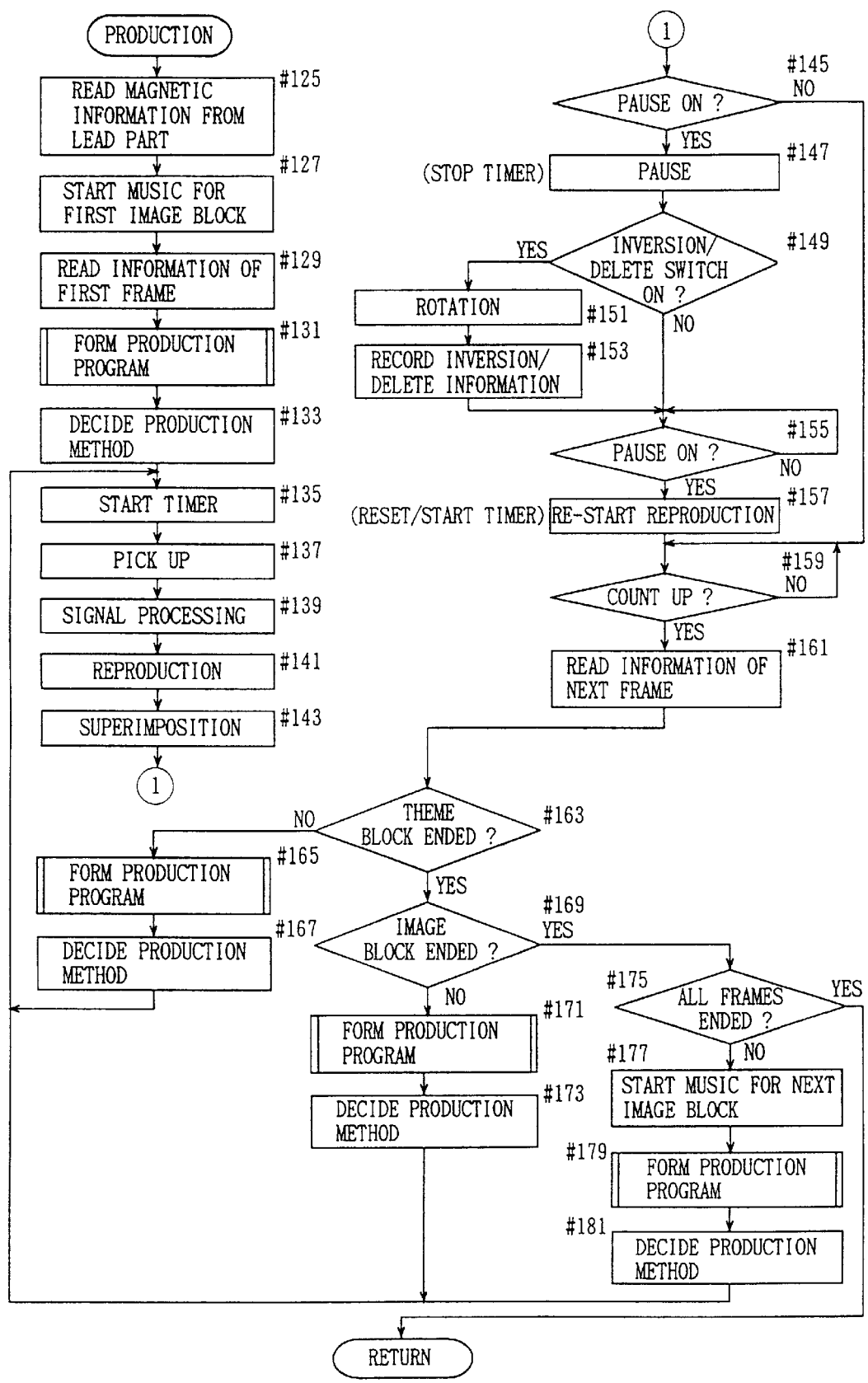
FIG. 8 is a flow chart illustrating an actual operation for production.

The actual operation for production is now described with reference to a flow chart shown in FIG. 8. At a step #125, the information recorded in the magnetic part of the lead part is read. A piece for the first image block is started from the read information (step #127). Thereafter information on the first frame is read from the magnetic information storage part 19 at a step #129. A production program is created from the as-read information (step #131). Formation of the production program is now described with reference to FIGS. 9 and 10.

Figure 9:
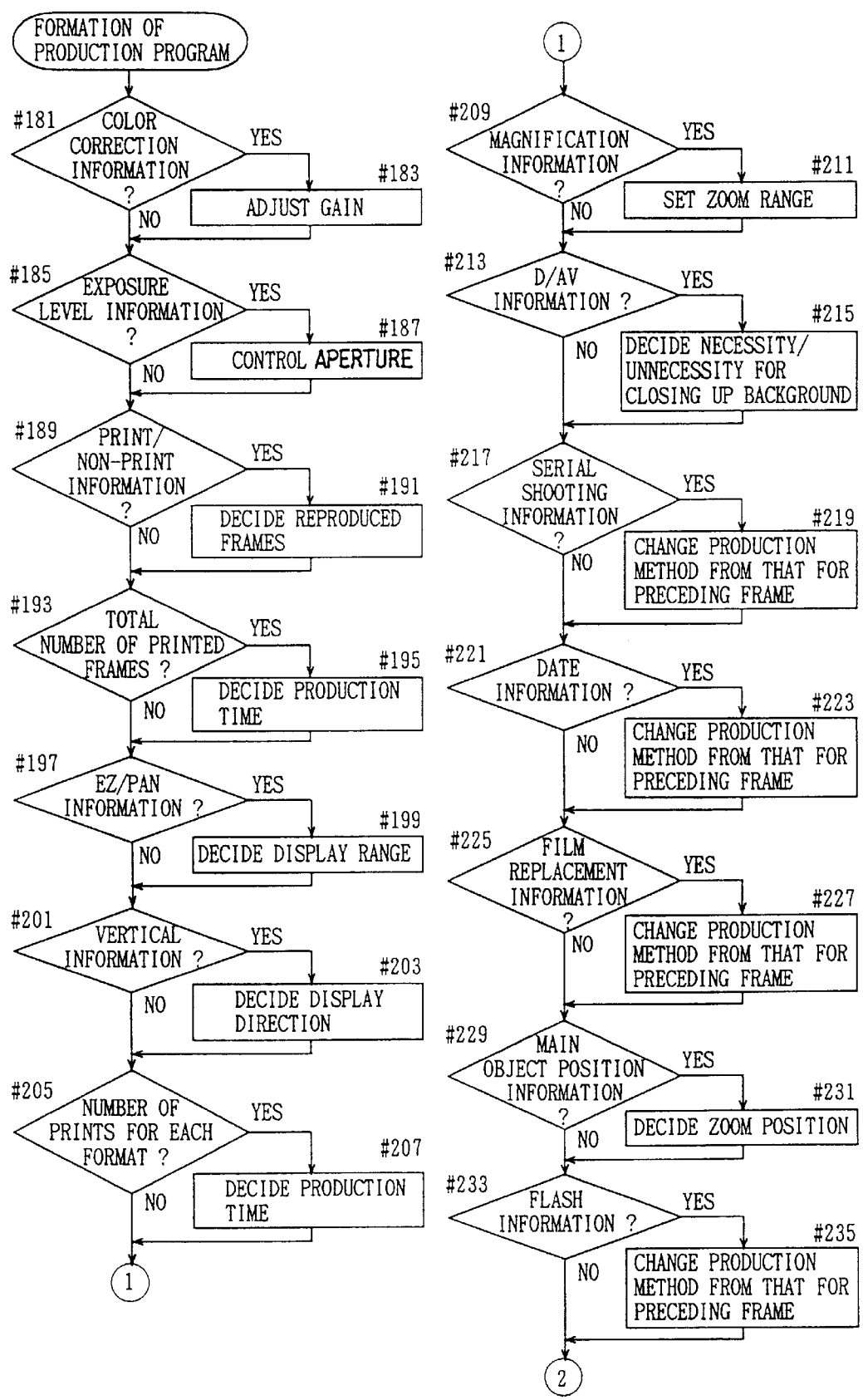
FIG. 9 is a flow chart showing formation of a production program.

If the information read in the operation shown in FIG. 9 includes color correction information, the gain of an output from the CCD 10 is adjusted on the basis of this information. Similarly, the aperture (exposure) is controlled by shooting exposure level information, reproduced frames are decided by print/non-print information, the production time is decided from the total number of printed frames, the range of display on the television is decided from electrozooming (EZ)/panorama (PAN) information, the direction of display is decided from vertical information, the production time is decided from format information (normal vertical or transverse position, PAN vertical or transverse position or EZ vertical or transverse position), the zooming range is decided from shooting magnification information, necessity/unnecessity for closing up the background is decided from a shooting distance (D) and aperture value information (AV), and the production method is changed from that for a preceding frame if serial shooting information is detected or date information indicates the same date (steps #181 to #223). If film replacement information is detected, the production method is changed from that for a frame before replacement (steps #225 to #227).

Figure 10:
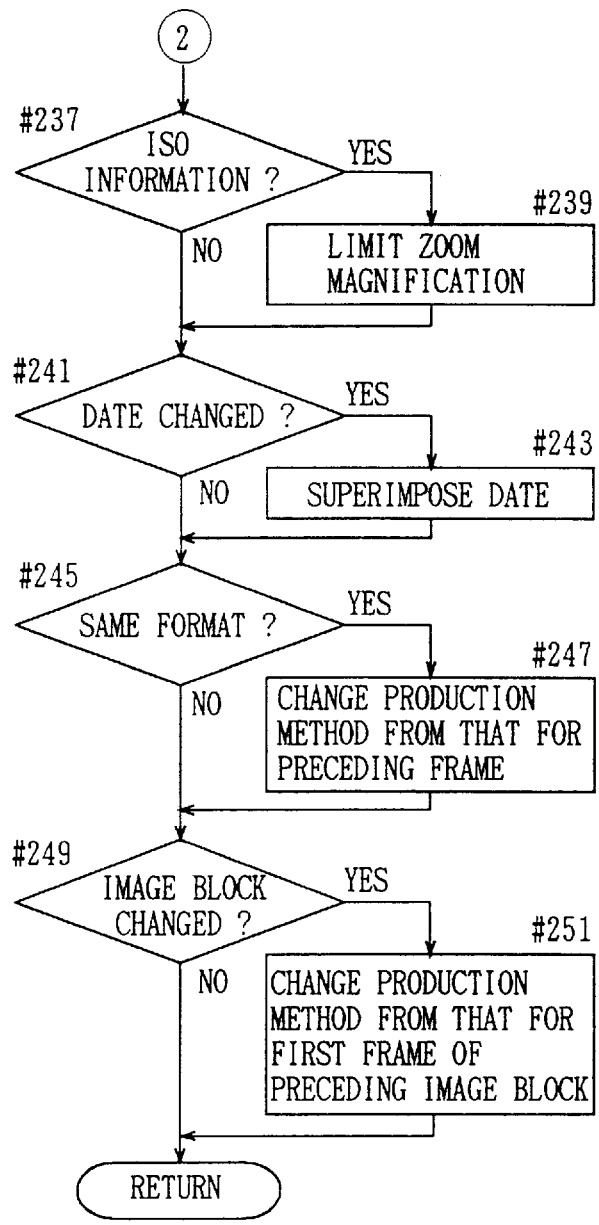
FIG. 10 is a flow chart showing formation of the production program.

If main object information is detected, the central position of zooming is decided through this information, and if flash information is detected, the production method is changed from that for the preceding frame on the assumption that luminance or the place of shooting has been changed (steps #229 to #235). Referring to FIG. 10, the zoom magnification is limited in response to ISO information of the film, and if the date is changed, superimposition display of the date is instructed to the superimposition part 13 (steps #237 to #241). If one of the aforementioned formats is continuous, the production method is changed from that for the preceding frame, while the production method is changed from that for the first frame of the preceding image block upon advance to a next image block (steps #245 to #249).

FIG. 21 shows exemplary production by the picture format magnification information shown in FIG. 9.

Referring to FIG. 21, production (1) is generally performed every format condition.

The numerals appearing in the rightmost column of "counter" represent count numbers for continuous times of the same production. When frames of the same format are continuous under the same conditions and the number of such continuous frames reaches any one of the count numbers, for example, the production (2) is performed.

The counter is reset when the conditions and the production method are changed or the production (2) is performed. In the case of the normal transverse format, the production (1) is switched to the production (2) in an overlapping system.

Symbols zu, zd and M appearing in FIG. 21 denote zoom-up, zoom-down and movement respectively.

Referring again to FIG. 8, the production method is determined (step #133) in response to the production program decided at the step #131. Thereafter a timer for automatic reproduction is started. Then pictures are taken at a step #137, and the data of the as-taken pictures are signal-processed. The signal-processed picture data are reproduced on the television, with superimposition of date information etc. (steps #139 to #143). When the pause switch provided in the operating part 3 is pushed during picture reproduction, the process is advanced to a step #147 to stop movement of the picture as well as the timer. If the inversion or erase (delete) switch is pushed during the stoppage of the picture, the process is advanced to a step #151 to rotate the picture if the inversion switch is pushed, and inversion or delete information is recorded in the magnetic information storage part 19 corresponding to the current frame at a step #153. When the pause switch is again pushed at a step #155, picture reproduction is re-started and the timer ie reset/started. The end of timer counting is waited at a step #159, and then the process is advanced to a step #161 to read shooting information for the next frame.

The information for the next frame is read at the step #161, and if the theme block is ended at a step #163, the process is advanced to a step #169, while the same is advanced to a step #165 in other case. The processing shown in FIGS. 9 and 10 is performed at the step #165 for forming a production program for the next frame, a production method is decided at a step #167, and the process is advanced to a step #135, to repeat the aforementioned operation. At-the step #169, on the other hand, a determination is made as-to whether or not the image block is also ended with the end of the theme block, and the process is advanced to a step #175 if the determination is of yes, while the same is advanced to a step #171 if the determination is of no.

A production program is formed in accordance with the processing shown in FIGS. 9 and 10 at the step #171, the production method is decided at a step #173 and the process is advanced to the step #135. At this time, the production method is made different from that for the first frame of the preceding block, to avoid monotonous production. At the step #175, on the other hand, a determination is made as to whether or not reproduction of all frames is ended with the end of the image block. If the determination is of no, the process is advanced to a step #177 to start music for the next image block, and then advanced to the step #171. The process is returned when reproduction of all frames is ended.

Figure 11:
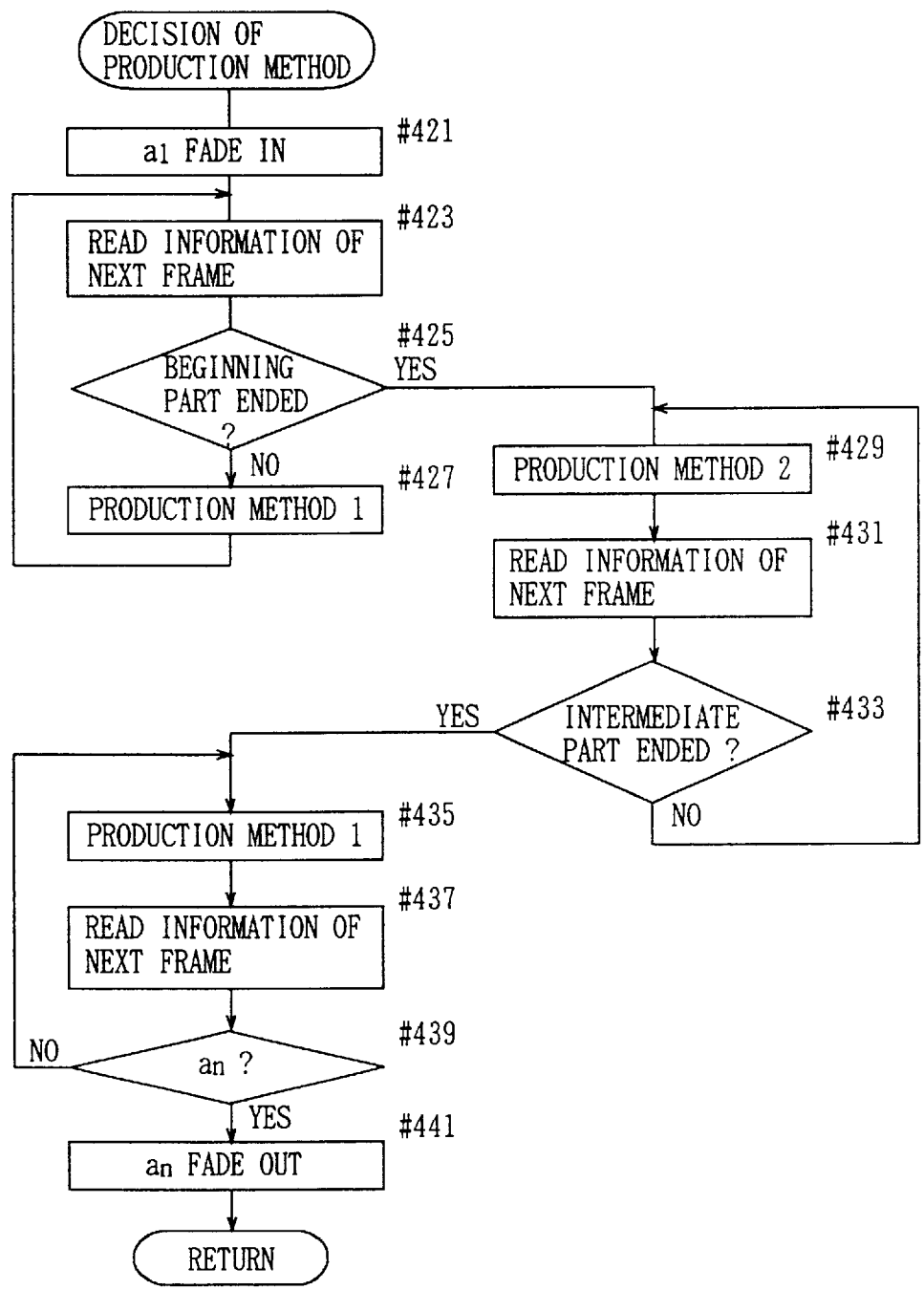
FIG. 11 is a flow chart showing an exemplary decision of a production method.

FIG. 11 illustrates exemplary decision of a production method with reference to a single image block.

Since the first frame al in the image block includes the first picture, production is performed in a fade-in manner for gradually outputting the picture (step #421), and information of the next frame is read at a step #423. A determination is made at a step #425 as to whether or not the beginning part of the theme block is ended, and the process is advanced to a step #429 if the determination is of yes, while the same is advanced to a step #427 if the determination is of no. At the step #427, a production method 1 including relatively small movement such as zooming, panning, tilting or scrolling is selected for the beginning part. At the step #429, on the other hand, a production method 2 including relatively large movement such as rotation or overlapping is selected on the assumption that the scene is advanced to the intermediate part of the theme block. The production with large movement is selected for the intermediate part, for introducing a climax.

Then, information on the next frame is read at a step #431 and the process is returned to the step #429 if the intermediate part is not yet ended, while the production method 1 including relatively small movement is selected at a step #435 similarly to the beginning part if the intermediate part is ended, on the assumption that the scene is moved to the end part. The information of the next frame is read at a step #437, and a determination is made at a step #439 as to whether or not the final frame of the image block is reached. If the determination is of no, the process is returned to the step #435. If the determination is of yes, on the other hand, the production of the image block is ended in a fade-out manner for gradually erasing the picture.

The production method is thus decided so that the image block is started with relatively small movement, gradually increased in movement and ended with relatively small movement again, thereby providing an exciting and entertaining film.

(2) Second Embodiment

Figure 12:
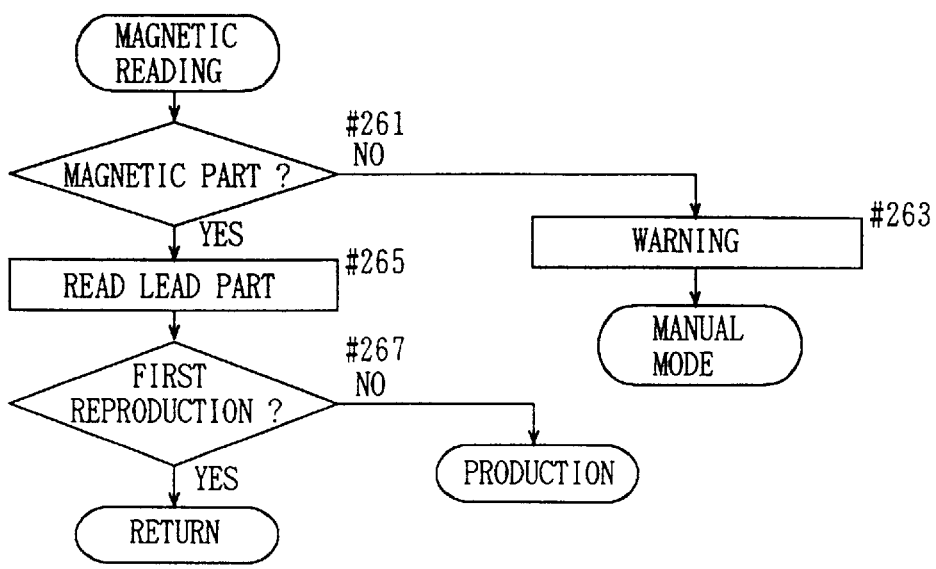
FIG. 12 is a flow chart illustrating the content of a second embodiment of the present invention.

A second embodiment of the present invention is now described with reference to FIGS. 12 to 14. While shooting information for all frames recorded in the magnetic part of the film is previously read in advance of reproduction and stored in the magnetic information storage part 19 in the first embodiment, each information is read in advance of reproduction of each frame in the second embodiment. Referring to FIG. 12, steps up to #267 are similar to those up to #27 in FIG. 3. If the film is reproduced for the first time at the step #267, the process is returned.

Figure 13:
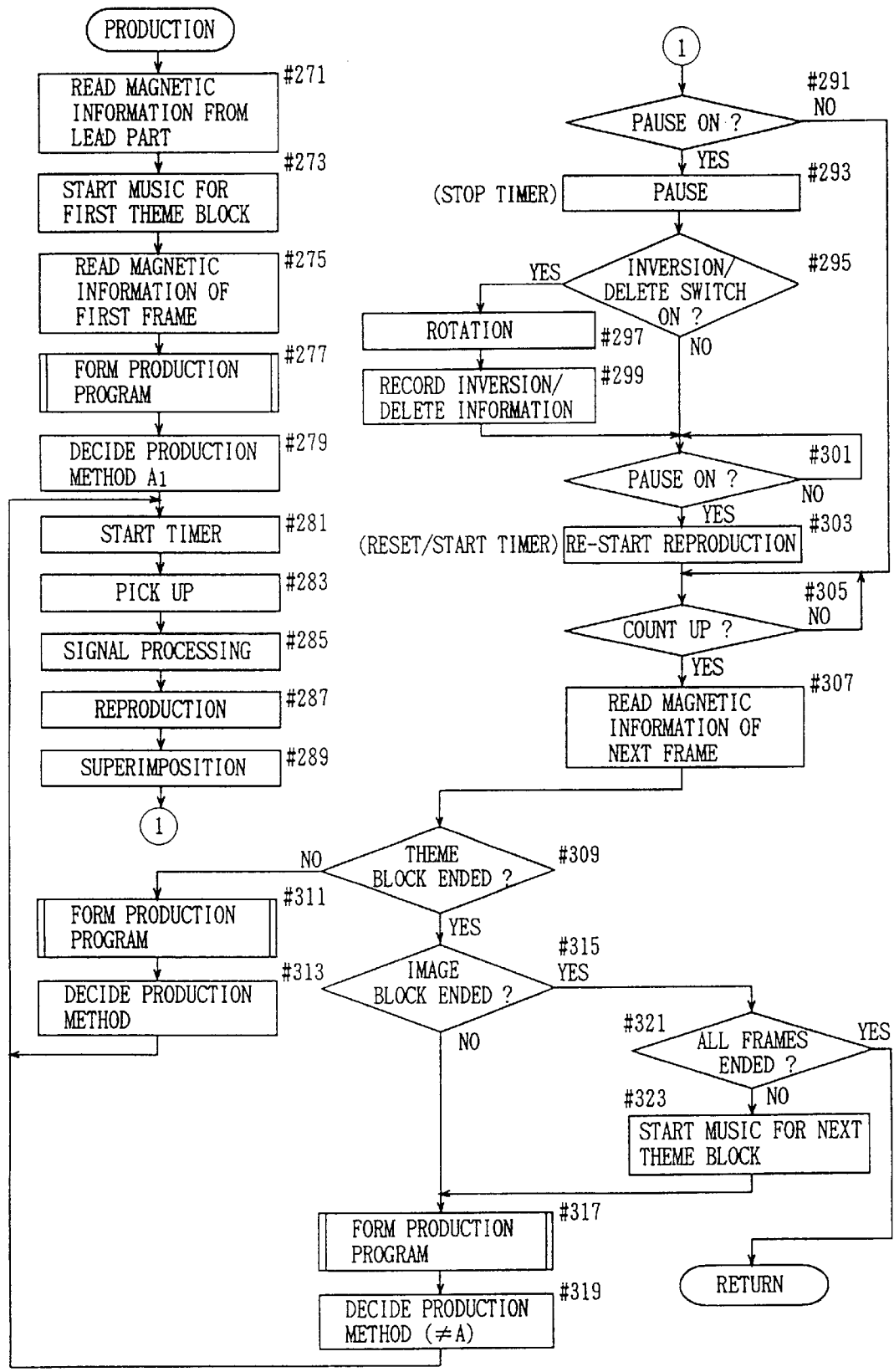
FIG. 13 is a flow chart illustrating the content of the second embodiment of the present invention.
Figure 14:
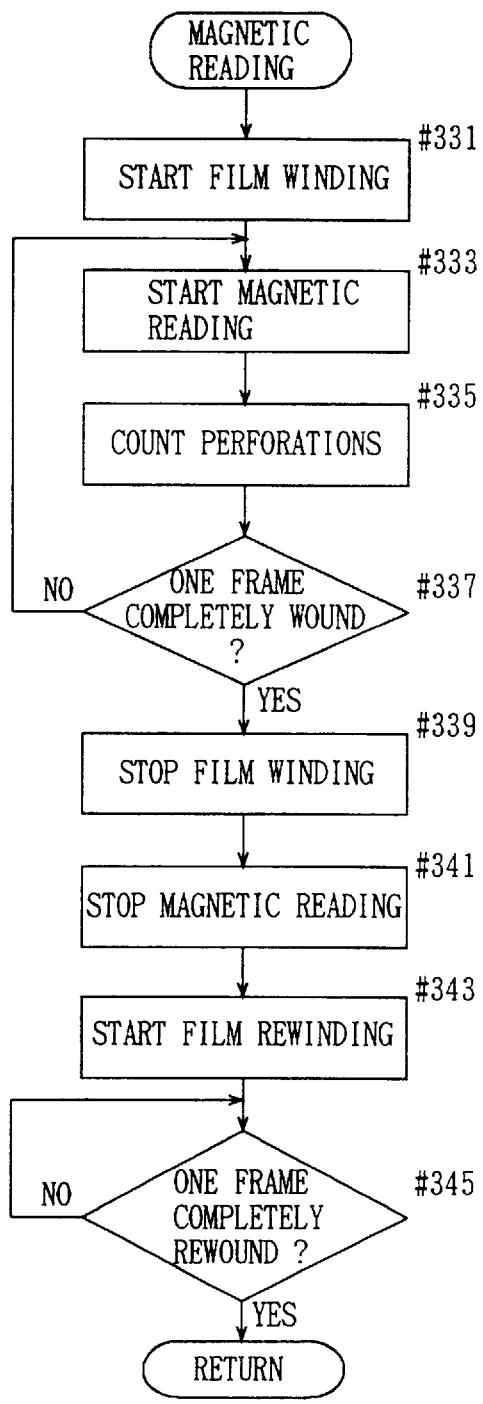
FIG. 14 is a flow chart illustrating the content of the second embodiment of the present invention.

Referring to FIG. 13, the operation of production in the second embodiment is now described in relation to only a portion which is different from that of the first embodiment. Although the information corresponding to each frame is read from the magnetic information storage part 19 in the first embodiment, the film is wound for one frame by a film feed part 1 before taking for reading magnetic information at a step #275 in the second embodiment, in order to form a production program. When the magnetic information is completely read, the film feed part 1 rewinds the film for one frame, to bring the same into a pickup waiting state. This also applies to a step #307. FIG. 14 shows such an operation.

According to the second embodiment, no memory region (magnetic information storage part 19) for all frames is required dissimilarly to the first embodiment, while the time from film loading to picture reproduction of the first frame is reduced.

(3) Third Embodiment

A third embodiment of the present invention is now described with reference to FIGS. 15 and 16. The third embodiment is adapted to first reproduce pictures which are recorded on a film 20 on a multiscreen entirely or by a plurality of frames, and to input vertical information or erase (delete) information in this state. If shooting information recorded on the film 20 includes neither vertical nor delete information, such data are thus inputted before actual reproduction, to avoid the trouble of inputting and correcting such data in advance of every frame reproduction. This operation is now described.

Figure 15:
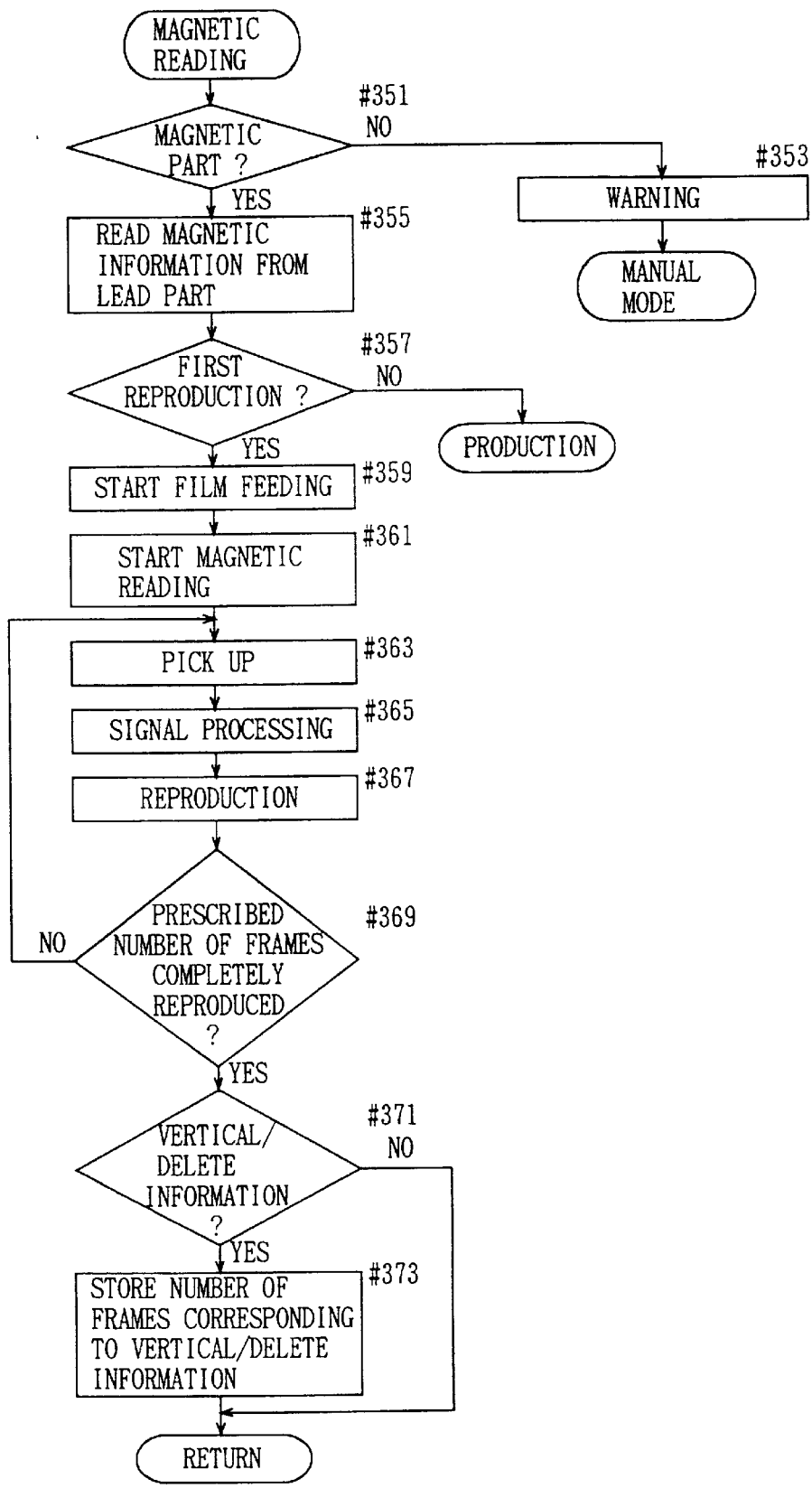
FIG. 15 is a flow chart illustrating the content of a third embodiment of the present invention.

Referring to FIG. 15, steps up to #361 are identical to those up to #31 in FIG. 3. At a step #363, pictures recorded on the film 20 are taken, signal-processed and reproduced on a television. In this case, the picture data are skipped (compressed) by the signal processing, so that a plurality of pictures are reproduced on the TV screen. When all or a prescribed number of frames are completely reproduced, the process is advanced to a step #371. When vertical or delete information is inputted at the step #371, the number of frames corresponding to the information is stored and the process is returned. In this case, the information may be recorded in magnetic parts of the corresponding frames, or in an integrated storage part such as the magnetic information storage part 19. If the information is stored in such a storage part, it is not necessary to again input the same for next reproduction.

Figure 16:
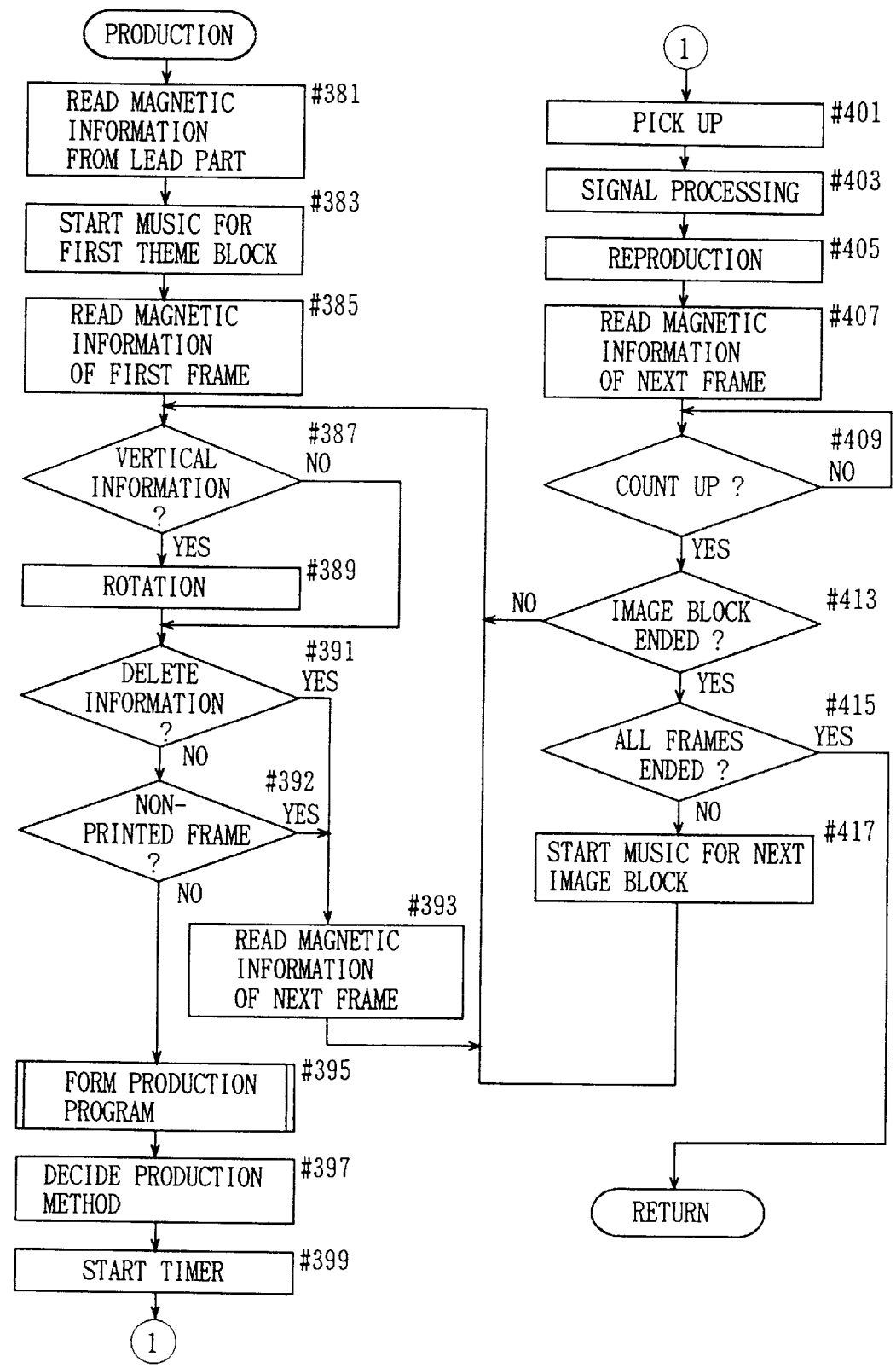
FIG. 16 is a flow chart illustrating the content of the third embodiment of the present invention.

Referring to FIG. 16, a production method according to the third embodiment is now described. At a step #381, information recorded in a magnetic part of a lead part is read. The information recorded in the lead part is related to image blocks, theme blocks and pieces, similarly to the first embodiment. At a step #383, a piece for the first theme block is reproduced from the information recorded in the lead part. Then, magnetic information for the first frame is read at a step #385. if the as-read information includes vertical information, the process is advanced to a step #389 so that the piece is reproduced with picture rotation on the assumption that the pictures must be rotated. If delete information is detected at a step #391, the process is advanced to a step #393 to read magnetic information for a next frame on the assumption that the current frame is not reproduced, and the process is returned to the step #387. if no delete information is detected, on the other hand, the process is advanced to a step #392 to determine whether or not the frame is printed. A non-printed frame is not reproduced since the same has been judged as defective in a processing station, and the process is advanced to a step #395 to form a production program. The program is formed through processing similar to that shown in FIGS. 9 and 10.

When the production method is decided at a step #397, a timer is started to perform taking, signal processing and reproduction. When the timer is counted up, magnetic information for a next frame is read and a determination is made as to whether or not the theme block, the image block and reproduction of all frames are ended. If the image block is ended, music for the next image block is started, and the process is returned when all frames are completely reproduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A still image reproducing apparatus for reproducing still images of a plurality of frames, said apparatus comprising:
   still image reproducing means for reproducing said still images;
   division means for dividing said still images of said plurality of frames into a plurality of groups each being formed by a still image in consecutive frames; and
   decision means for deciding a display style for reproducing a still image of a frame based on the frame's position in its respective group.

2. A still image reproducing apparatus in accordance with claim 1, wherein said plurality of still images include pictures recorded in a developed film.

3. A still image reproducing apparatus for reproducing still images of a plurality of frames, each said frame of each said still image including image information, said apparatus comprising:
   still image reproducing means for reproducing said still images; and
   division means for dividing said still images of said plurality of frames into a plurality of groups, each being formed by a still image in consecutive frames, on the basis of said image information.

4. A still image reproducing apparatus in accordance with claim 3, wherein said still images of said plurality of frames include pictures recorded in a developed film.

5. A still image reproducing apparatus in accordance with claim 3, wherein said image information includes information on the date of recording of said still images.

6. A still image reproducing apparatus in accordance with claim 3, further including decision means for deciding a display style for reproducing a still image of a frame based on the frame's position in its respective group.

7. A film video player for reproducing pictures recorded in a developed film, each said picture recorded in said film including picture information, said player comprising:
   picture reproducing means for reproducing said pictures recorded in said developed film;
   division means for dividing said pictures of a plurality of frames into a plurality of groups, each being formed by a picture in consecutive frames, on the basis of said picture information; and
   recording means for recording information on a state of said divided groups on said film.

8. A still image reproducing apparatus for reproducing still images of a plurality of frames, said apparatus comprising:
   still image reproducing means for reproducing said still images of said plurality of frames;
   music reproducing means for reproducing music in reproduction of said still images;
   division means for dividing said still images of said plurality of frames into a plurality of groups each being formed by a still image in consecutive frames;
   decision means for deciding music corresponding to said groups as divided by said division means; and
   control means for controlling said music reproducing means for reproducing said music decided by said decision means during reproduction of said still image in one of said plurality of groups by said still image reproducing means.

9. A still image reproducing apparatus in accordance with claim 8, wherein said still images of said plurality of frames include pictures recorded in a developed film.

10. A still image reproduction apparatus for reproducing a plurality of still images, comprising:
    still image reproducing means for reproducing still images;
    read means for reading information provided in respective frames of said still images; and
    decision means for deciding a display style for reproducing a still image of a frame on the basis of the number of types of said information being read by said read means.

11. A still image reproducing apparatus in accordance with claim 10, wherein said still image reproducing means reproduces still images recorded in a developed film.

12. A still image reproducing apparatus in accordance with claim 10, wherein said decision means includes dividing means for dividing said plurality of still images into a plurality of groups on the basis of said read information, for deciding the display style on the basis of the frame's position in its respective group.

13. A still image reproducing apparatus for reproducing still images of a plurality of frames, said still image reproducer comprising:

still image reproducing means for reproducing still images of a plurality of frames;

read means for reading information provided in each of said plurality of frames;

first decision means for deciding a display style for each of said plurality of frames on the basis of information provided in each said frame itself; and second decision means for deciding a display style for each of said plurality of frames on the basis of a plurality of data provided in said plurality of frames.

14. A still image reproducing apparatus in accordance with claim 13, wherein said still image reproducing means reproduces still images recorded in a developed film.

15. A still image reproducing apparatus in accordance with claim 14, wherein said information provided in each said frame is recorded on a film.

16. A film video player for reproducing pictures recorded in a developed film, said film video player comprising:

picture reproducing means for reproducing pictures of a plurality of frames recorded in a developed film, each said frame of said film having shooting information as to a picture of said frame in a first recording region;

read means for reading information of each said frame recorded in said first recording region;

decision means for deciding a display style for each said frame on the basis of information of said plurality of frames being read by said read means; and recording means for recording said display style decided by said decision means in a second recording region provided apart from the first recording region.

17. A player in accordance with claim 16, wherein said first recording region is provided on said film.

18. A player in accordance with claim 16, wherein said second recording region is provided on said film.

19. A player in accordance with claim 16, wherein said second recording region is provided in a lead portion of said film.

20. A still image reproducer for reproducing still images of a plurality of frames, said still image reproducer comprising:

still image reproducing means for reproducing still images of a plurality of frames;

decision means for deciding a display style for a still image of each said frame; and control means for controlling said decision means not to decide the same display style continuously over a prescribed number of times.

21. A still image reproducer in accordance with claim 20, wherein said still image reproducing means reproduces still images recorded in a developed film.

22. A still image reproducer in accordance with claim 20, wherein said decision means decides said display style on the basis of information provided in each of said plurality of frames.

23. A still image reproducing apparatus in accordance with claim 1, wherein said division means divides said still images into the plurality of groups in accordance with a predetermined condition.

24. A still image reproducing apparatus in accordance with claim 23, wherein said predetermined condition is whether the date of recording of the still images are close to each other.

25. A still image reproducing apparatus in accordance with claim 1, wherein said frame's position includes a beginning portion of the group or an end portion of the group.

26. A film video player in accordance with claim 7, wherein said recording means records boundary information between the divided groups as said information on the state of the divided groups.

* * * * *